United States Patent [19]

Merryfull

[11] Patent Number: 5,143,148
[45] Date of Patent: Sep. 1, 1992

[54] THERMAL STORAGE APPARATUS

[75] Inventor: Albert E. Merryfull, Sydney, Australia

[73] Assignee: Berhaz Pty. Limited, St. Ives, Australia

[21] Appl. No.: 571,667

[22] PCT Filed: Jan. 3, 1990

[86] PCT No.: PCT/AU90/00002
§ 371 Date: Aug. 28, 1990
§ 102(e) Date: Aug. 28, 1990

[87] PCT Pub. No.: WO90/07688
PCT Pub. Date: Jul. 12, 1990

[30] Foreign Application Priority Data

Jan. 3, 1989 [AU] Australia .................. PJ2146
Feb. 3, 1989 [AU] Australia .................. PJ2546

[51] Int. Cl.⁵ .................. F28D 20/00; F25D 3/00
[52] U.S. Cl. .................. 165/10; 62/59; 62/430; 62/434; 165/78; 165/104.17; 165/164; 165/145
[58] Field of Search .................. 165/10, 104.17, 164, 165/78, 145; 62/430, 434, 59

[56] References Cited

U.S. PATENT DOCUMENTS

| 2,160,333 | 5/1939 | Johnston | 62/434 |
| 2,538,015 | 1/1951 | Kleist | 165/104.17 |
| 2,571,924 | 10/1951 | Morrison | 62/434 |
| 3,215,193 | 11/1965 | Kocher | 165/104.17 |
| 4,294,078 | 10/1981 | MacCracken | |
| 4,324,287 | 4/1982 | Schroder | |
| 4,403,645 | 9/1983 | MacCracken | |
| 4,445,566 | 5/1984 | Laing et al. | 165/10 |

FOREIGN PATENT DOCUMENTS

| 2125277 | 7/1978 | Australia . |
| 0153605 | 9/1985 | European Pat. Off. . |
| 8809261 | 5/1988 | PCT Int'l Appl. . |
| 399435 | 10/1933 | United Kingdom . |
| 989836 | 4/1965 | United Kingdom . |
| 1332755 | 10/1973 | United Kingdom . |

OTHER PUBLICATIONS

Patent Abstract of Japan, m67, p. 18, JP, A. 56-18224, (Aichi Jiyuutaku Kogyo KK) 20 Feb. 1981 (20.2.81).
Patent Abstract of Japan, m66, p. 29, JP, A. 56-16039, (Aichi Jiyuutaku Kogyo KK) 16 Feb. 1981 (16.02.81) "Heating System Using Hot-Wind Heating and Radiation Heating in Combination".
Patent Abstract of Japan, m594, p. 57, JP, A. 62-795, (Agency of Ind. Science and Technol) see p. 3 (Masayuki Kamimoto) Jan. 1967 (06.01.87) "Heat Accumulating Device Utilizing Spiral Type Heat Exchanger".
Patent Abstract of Japan, M-726, p. 38, JP, A. 63-58059 (Hitachi Ltd.) 12 Mar. 1988 (12.03.88) "Heat Accumulator".

Primary Examiner—Albert W. Davis, Jr.
Attorney, Agent, or Firm—Beveridge, DeGrandi & Weilacher

[57] ABSTRACT

A thermal storage apparatus comprises a series of stacked heat exchange modules. Each module extends horizontally and comprises channels separated by corrugations. Each channel has underneath it a heat exchange fluid pipe through which a primary or secondary coolant circulates. An inlet pipe delivers the phase change medium, for example water, to the lower most module from which it circulates to the top of the apparatus. The modules are stacked by the wall of a module engaging a groove of the next module above it.

34 Claims, 8 Drawing Sheets

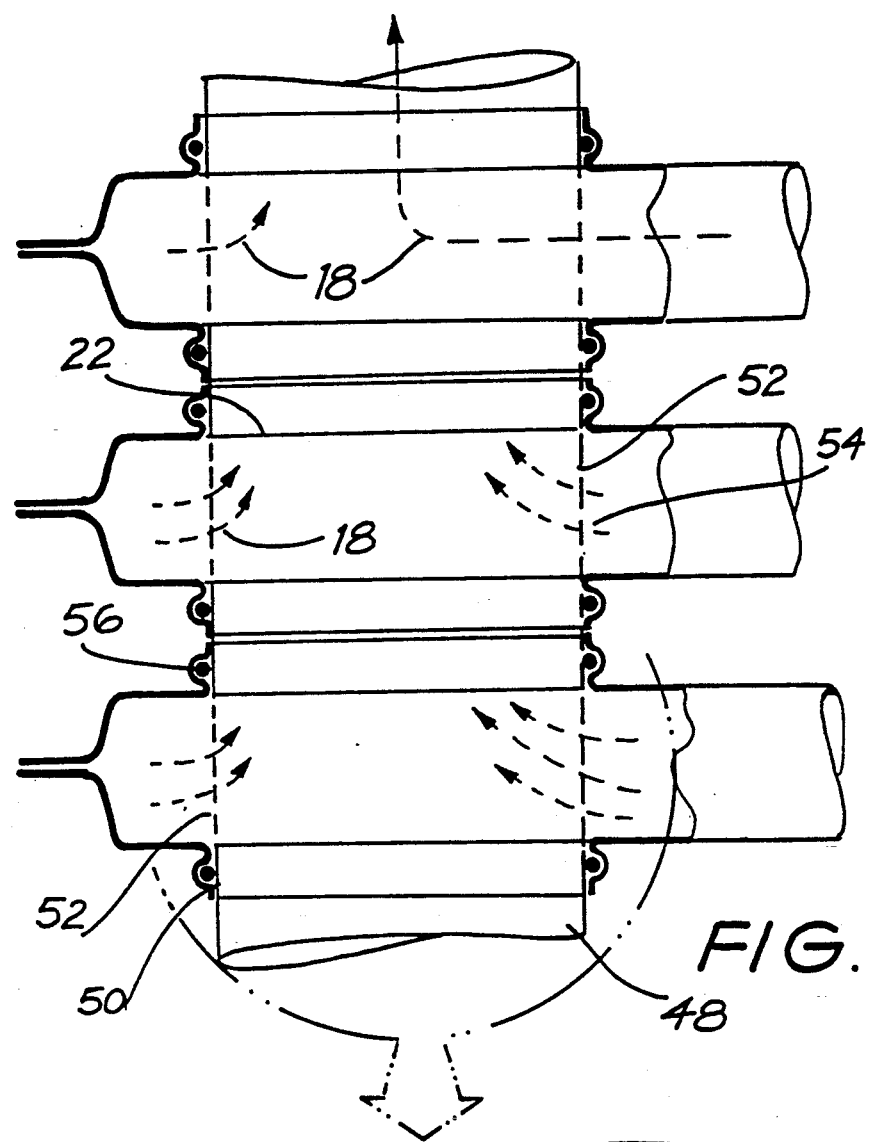
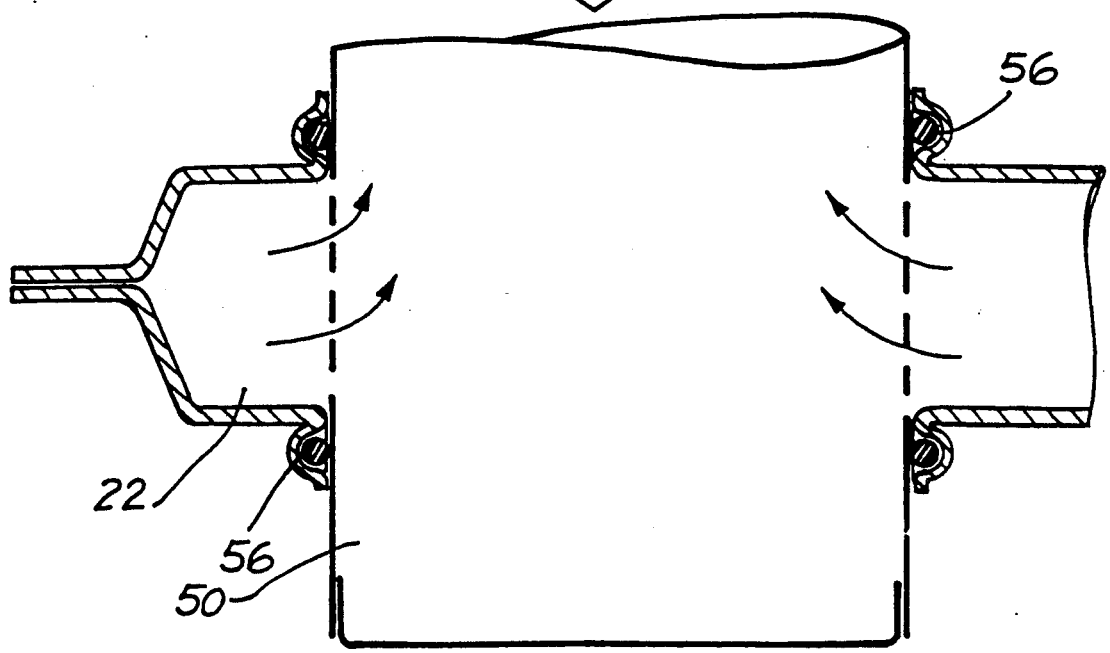
FIG. 2

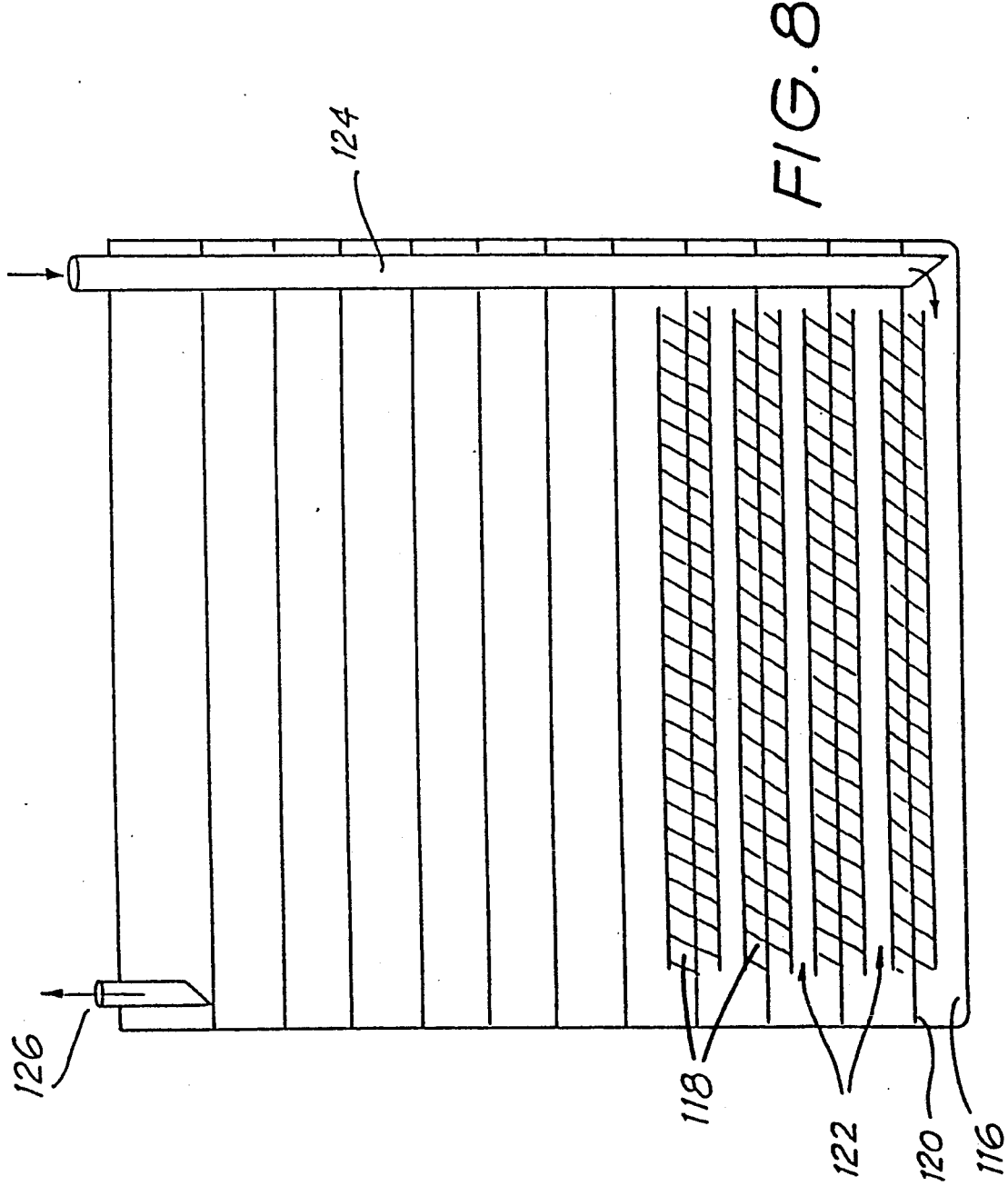

THERMAL STORAGE APPARATUS

The present invention relates to a thermal storage apparatus and in particular to a heat exchanger module in such an apparatus. The thermal storage apparatus is of the kind that can be employed in cooling and heating systems for buildings, fluid refrigeration apparatus and similar types of installations.

BACKGROUND OF THE INVENTION

In air conditioning systems thermal storage devices are employed as thermal energy sinks storing energy in a phase change medium (PCM). One such medium is water and known systems employ the refrigeration of the water to form ice. The circulation of a primary or secondary refrigerant is circulated through heat exchanger elements to form the ice in a storage tank. The apparatus is often powered by electrical energy and the formation of the ice can therefore be performed when electrical charges from the supply utility are minimal. The ice formed in the storage apparatus can subsequently be used for refrigerating in air conditioning or other systems as required.

In prior apparatus such as described in PCT application WO88/09261 a heat exchanger element is immersed in a tank of water. The element is manufactured from extruded polyethylene tubes wound into the form of spiral coils held in place by spacer bars. Individual spirals are connected to inlet and outlet manifolds such that the spirals are in generally planar configuration. The coils are not restrained against vertical motion to allow for expansion and contraction in the freezing and melting of ice formed on the coils. A secondary refrigerant such as a brine solution is circulated through the heat exchanger coils at a suitably low temperature to induce ice formation.

In another prior art apparatus heat exchanger coils of galvanised steel are arranged in a vertical plane to form a heat exchanger unit. Several units filled with water as the PCM are arranged in spaced parallel planes in a tank to form a thermal storage system. The coils in a given unit form a serpentine path from the base to the top of the unit. In this type of system experience has shown that as ice builds about the heat exchanger coils a certain amount of cold spills off the vertical ice walls causing extra ice to build at the base of the tank and progressively up the sides of each ice making unit. Over a period of time this buildup can block the flow of water and prevent the system from operating. This occurs as the incoming water is fed in at the bottom of each unit. This system also employs an air pump to produce turbulence in the tank to promote heat exchange between the heat exchanger coils and the storage medium, water. This agitation is further inhibited by the buildup of ice in the lower portions of the tank about the base of each unit.

Another prior art system is described in U.S. Pat. Nos. 4,403,645 and 4,294,078 to MacCracken. A tank is filled with a roll of a flexible tubing mat with rubberized hair spacing the successive layers of the mat. The mat comprises a grid of twin tubings kept closely spaced and fixed to a rigid plastic strip by a flexible plastic strip. Coolant (the heat transfer liquid) is circulated through the tubing. This system involves a complex manufacturing procedure and results in a large volume of the tank being occupied by the mat reducing the available capacity for the PCM employed.

The present invention seeks to overcome disadvantages in these prior art systems or to substantially ameliorate them.

SUMMARY OF THE INVENTION

According to one aspect of the invention there is provided a heat exchange module including
a substantially planar base means having a top surface and a bottom surface;
a wall extending from said base defining a perimeter of said base;
a path extending across said top surface of said base for circulating a phase change medium (PCM) fluid from an inlet to an outlet; and
heat exchange fluid (HEF) means for carrying a HEF from a HEF inlet to a HEF outlet across one of said surfaces of said base, said HEF means substantially conforming to the shape of said path.

According to another aspect of the invention there is provided a thermal storage apparatus including
a stack of a plurality of heat exchange modules stacked one above the other, each module including
a substantially planar base having a top surface and a bottom surface, a wall extending from said base defining a perimeter of and enclosing said base, a path extending across said top surface of said base for circulating a PCM fluid thereacross from a PCM inlet to a PCM outlet, and HEF means for carrying a HEF from a HEF inlet to a HEF outlet across one of said surfaces of said base and substantially conforming to the shape of said path, and an aperture in each module;
said apertures joining the associated path of a module of said stack with the associated path of an adjacent module;
HEF inlet manifold means for interconnecting HEF inlets of adjacent modules;
HEF outlet manifold means for interconnecting HEF outlets of adjacent modules; and
a further module at a bottom of said stack, said further module having a substantially planar base with top surface and a bottom surface, a wall extending from said base defining a perimeter of said base, a path extending across said top surface of said base for circulating a PCM fluid thereacross from an inlet to an outlet, said path of said further module being interconnected with the path of the lower most module of said stack; and
means for circulating a PCM fluid through said stack and said further module along said respective paths.

Preferably, the path(s) can be arranged in serpentine, or spiral configurations. These configurations are by way of example only and are not to be considered as limiting on the invention.

According to another aspect of the invention there is provided a heat exchange module including a base having
a top and bottom surface, a wall extending from said base defining a perimeter of said base, heat exchange means forming within said base for the circulation of a heat exchange fluid (HEF) across said base between an inlet manifold and an outlet manifold.

According to a further aspect of the invention there is provided a thermal storage apparatus including a stack of modules with each module including
a base having a top and a bottom surface, a wall extending from said base defining a perimeter of said base, heat exchange means formed within said base for the circulation of a heat exchange fluid (HEF) across said base between an inlet manifold and an outlet manifold;

at least one apertures in the base of each module for the passage of a PCM fluid between adjacent modules;

a vertical HEF inlet manifold connecting the inlet manifolds of each module;

a vertical HEF outlet manifold connecting the outlet manifolds of each module; and means for supporting adjacent modules in superposed nested relation in said stack.

The heat exchange elements can be made in copper or plastic, for example polyethylene or polypropylene. The modules can also be made as mouldings in two halves which can be glued or ultrasonically welded together. Typically, the mouldings can be pressure or blow moulded.

BRIEF DESCRIPTION OF THE DRAWINGS

Preferred embodiments of the invention will now be described with respect to the following drawings in which:

FIG. 2 shows a schematic of the interconnection of a number of modules as shown in FIG. 1;

FIG. 8 shows schematically a thermal storage apparatus incorporating the module according to the invention.

PREFERRED MODES OF PERFORMING THE INVENTION

Figure 1:
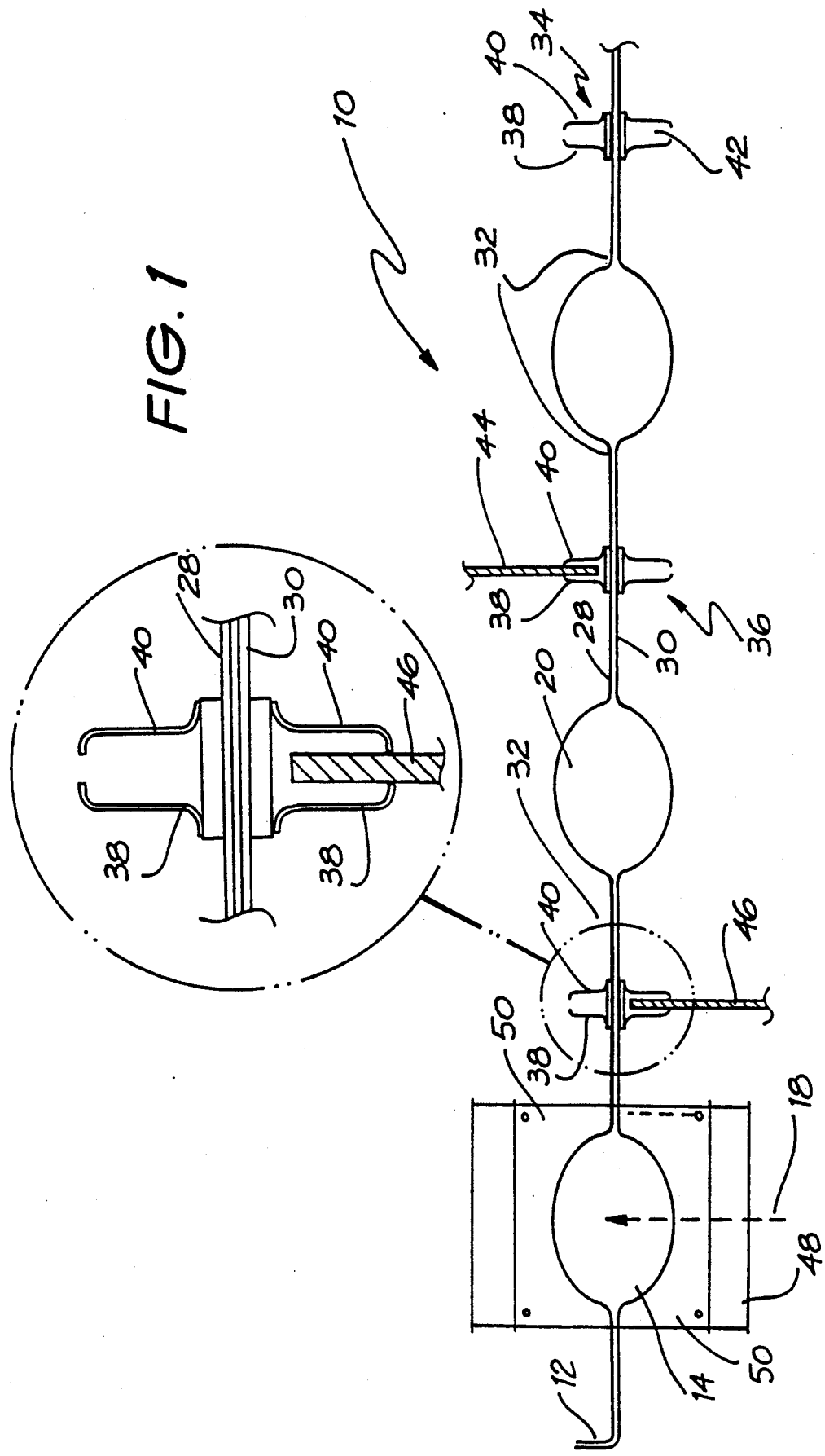
FIG. 1 shows a schematic cross section of a first embodiment of a module according to the invention.

FIGS. 1-4 show a first embodiment of a module 10. The module 10, as shown more clearly in plan in FIG. 4, comprises an outer wall 12 of circular shape. The module 10 is a flat tray shape formed with channels as will presently be described.

Inwardly of the wall 12 and extending arcuately for approximately one half the perimeter of the wall 12 is an inlet manifold 14 for the heat exchange fluid (HEF). The HEF enters the horizontal inlet manifold 14 through the orifice 16 (from an inlet vertical manifold 48) and flows as shown by arrows 18 into the parallel channels 20 across the width of the module 10 to the horizontal outlet manifold 22, which extends in mirror image to the inlet manifold 14. An outlet orifice 24 provides an outlet for the HEF through a vertical manifold (see FIG. 2, item 48) to an adjacent module 10 when the modules are stacked in a manner to be described below.

Thus the HEF flows in parallel circuits in channels 20 from the inlet manifold 14 to the outlet manifold 22. This provides a low pressure drop for the HEF for a given area of module 10.

An aperture 26 is located close to the perimeter wall 12 to allow the influx or the egress of PCM to or from the module 10 when the module is assembled. In use, the aperture 26 allows the PCM to cover the module 10 and any excess to flow between the modules. This embodiment is used with a static PCM fluid 28.

Figure 3:
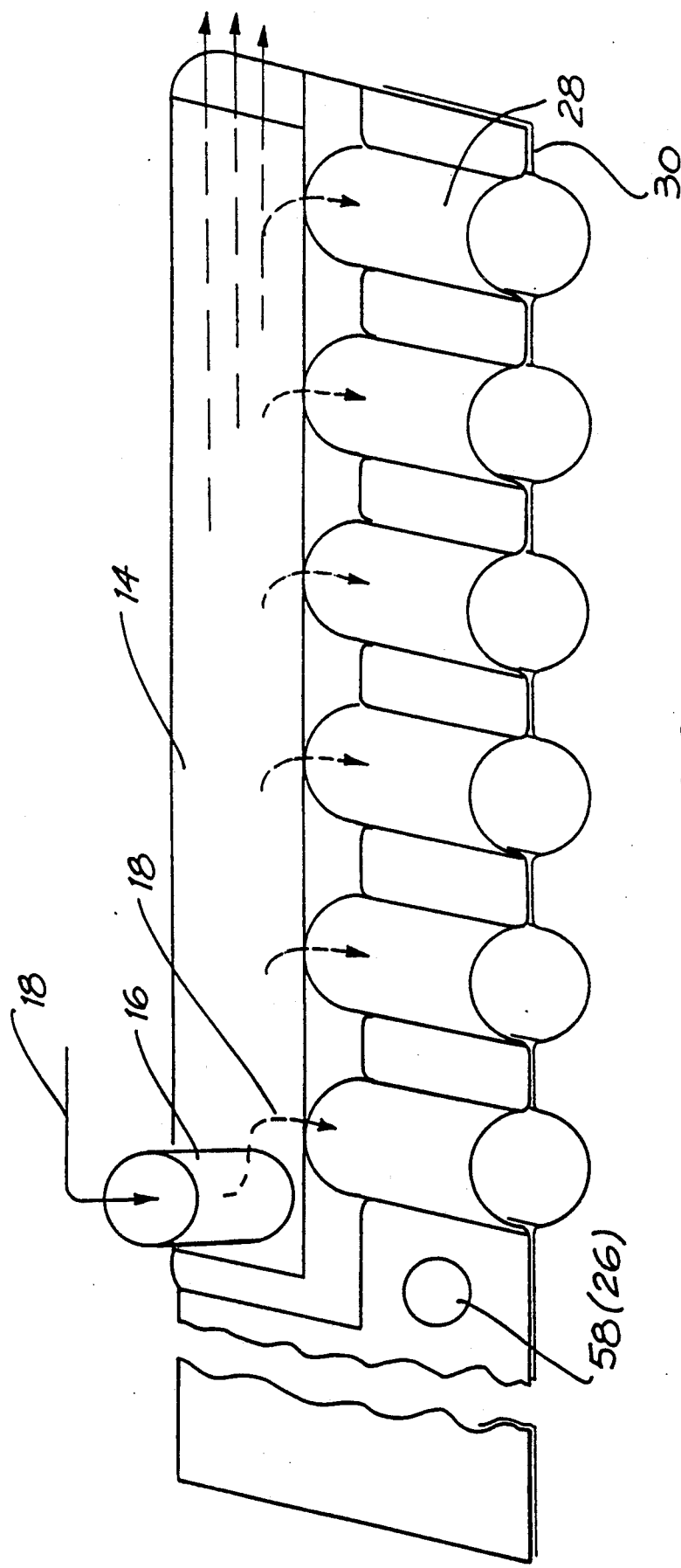
FIG. 3 shows schematically a method of making the module of FIG. 1.
Figure 4:
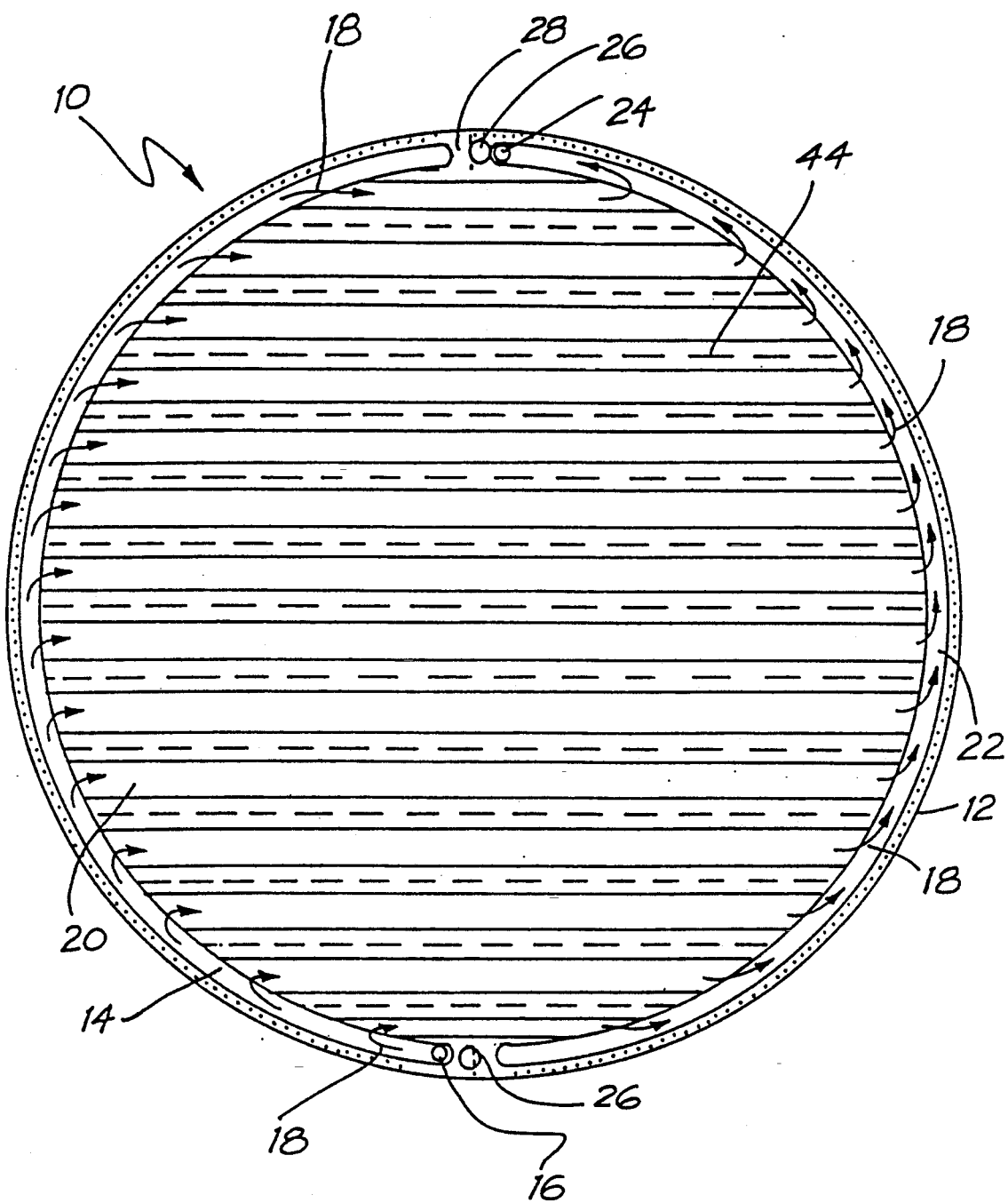
FIG. 4 shows schematically a view in plan of the module of FIG. 1.

As shown in FIGS. 1 and 3 the module 10 can be made from a pair of halves 28 and 30 by a suitable molding technique. The two halves 28 and 30 are joined by a suitable method such as adhesive bonding or ultrasonic welding to form the basic module having channels 20 separated by planar sections or regions 32 formed between the channels 20. As described with respect to FIG. 4 the channels 20 circulate the HEF in use and the PCM covers the surface of the module 10.

In order to support a stack of modules clips 34 and 36 are provided on the upper and lower surfaces of the planar regions 32. These clips 34 and 36 comprise planar members 38 and 40 separated by a gap 42 to accommodate support members 44 or 46. The clips 34 and 36 extend respectively upwardly or downwardly and hold in place the members 44 or 46. Thus the support members 44, 46 space apart and support adjacent modules when stacked one on the other. The planar members 38 and 40 may be narrowed towards their free ends to provide a press fit for the support members 44 or 46 when accommodated within the clips 34, 36.

In order to provide support and sealing between adjacent modules the perimeter wall 12 is formed with an upwardly curved edge.

When modules are stacked one above the other spaced by support members 44 and 46, the inlet orifices 16 of successive modules and the outlet orifices 24 are aligned. These orifices 16, 24 are interconnected by a vertical manifold 48. As shown in FIG. 2 the vertical manifold 48 is connected with each module by a collar 50 having suitable openings 52 to connect to the manifold 14 or 22 as the case may be. As shown by the arrows 54 FIG. 2 shows the case of interconnection of a stack of module outlet manifolds. Each collar 50 is sealed to its respective module by top and bottom O-ring seals 56. In this form the HEF flows in parallel across each of the modules 10. This has the advantage of providing a low pressure drop for the heat exchange fluid. This minimises the power requirements for the pump circulating the fluid.

Alternatively, the embodiment of FIGS. 1-4 may be varied in the following manner. Instead of having the heat exchange fluid flowing parallel in each of the modules from central inlet and outlet orifices 16 and 24, the fluid may be circulated in parallel within a given module but in a reverse direction in alternate modules. Alternate modules are then rotated 180 degrees relative to the next lowermost module such that the outlet orifice 24 is aligned with the next module's inlet orifice 16 in the stack. In this way a combined series-parallel combination of heat exchange fluid flow is provided. In this variation of the embodiment of FIGS. 1-4 the vertical manifold 48 is replaced by a number of manifolds extending between pairs of modules on alternate diametrically opposed sides of a stack.

To form a thermal storage apparatus as described above a number of modules are assembled in a stack with appropriate support from the members 44 and 46 and appropriate inter-connection of the inlet and/or outlet manifolds to suitable inlet and outlet points for the circulating heat exchange fluid. The stack is then filled with a PCM, for example water, with circulation of the PCM between modules provided by the apertures 26 provided in each module.

The HEF channels 20 circulate a secondary refrigerant such as brine or a 20% water and ethylene glycol mixture. These fluids are compatible with the polyethylene or polypropylene with which the module 10 is preferably made.

Figure 5:
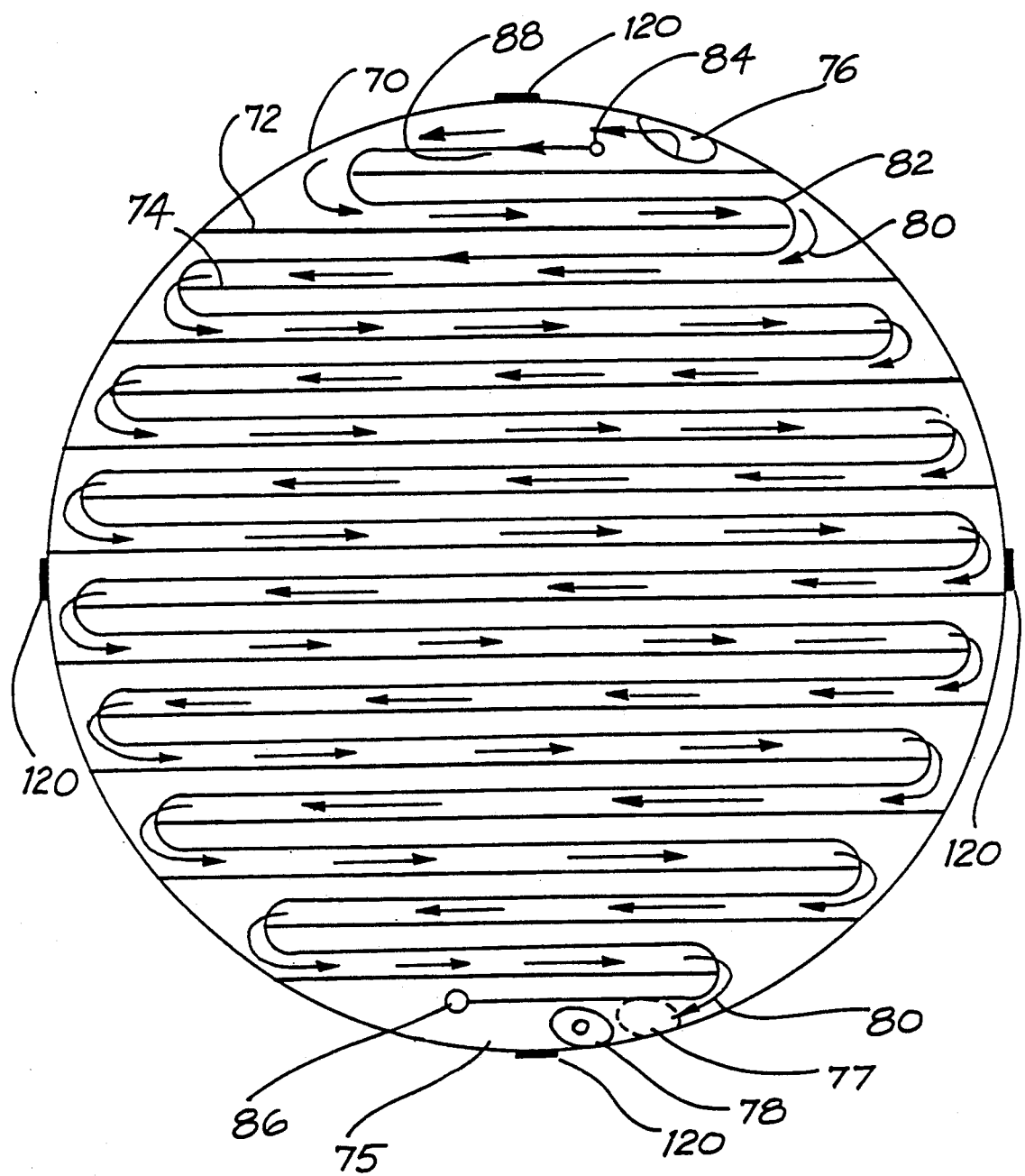
FIG. 5 shows schematically a second embodiment of a module according to the invention.

A second embodiment is shown in FIG. 5 where as for the embodiment shown in FIGS. 1–4 a circular module is shown. The module is defined by perimeter wall 70. A series of interdigitated walls 72 and 74 alternate across the diameter of the module. These walls 72 and 74 define a serpentine path from a start at the inlet aperture or window 76 to an end region 75. Outlet from region 75 is provided by the inlet 77 of an adjacent module (shown in dotted lines in FIG. 5). In order to align the appropriate PCM inlet and outlets, apertures 76 and 77 are provided in mirrored positions of the module's centre line in alternate modules. Thus the PCM flow alternates across successive modules. Aperture 78 accommodates the PCM inlet pipe which extends through each module to the lowermost module of an assembly. In use, a PCM is circulated along this path as shown by the arrows 80.

A heat exchanger coil 82 follows this serpentine path from a HEF inlet 84 to a HEF outlet 86. As shown in FIG. 5 the sense of the circulating fluid, as indicated by the arrow 88, is in the same sense as the circulation of the PCM. Though this is a preferred form of the embodiment it is also contemplated that counter circulation of heat exchange fluid and PCM fluid can be employed.

Figure 7:
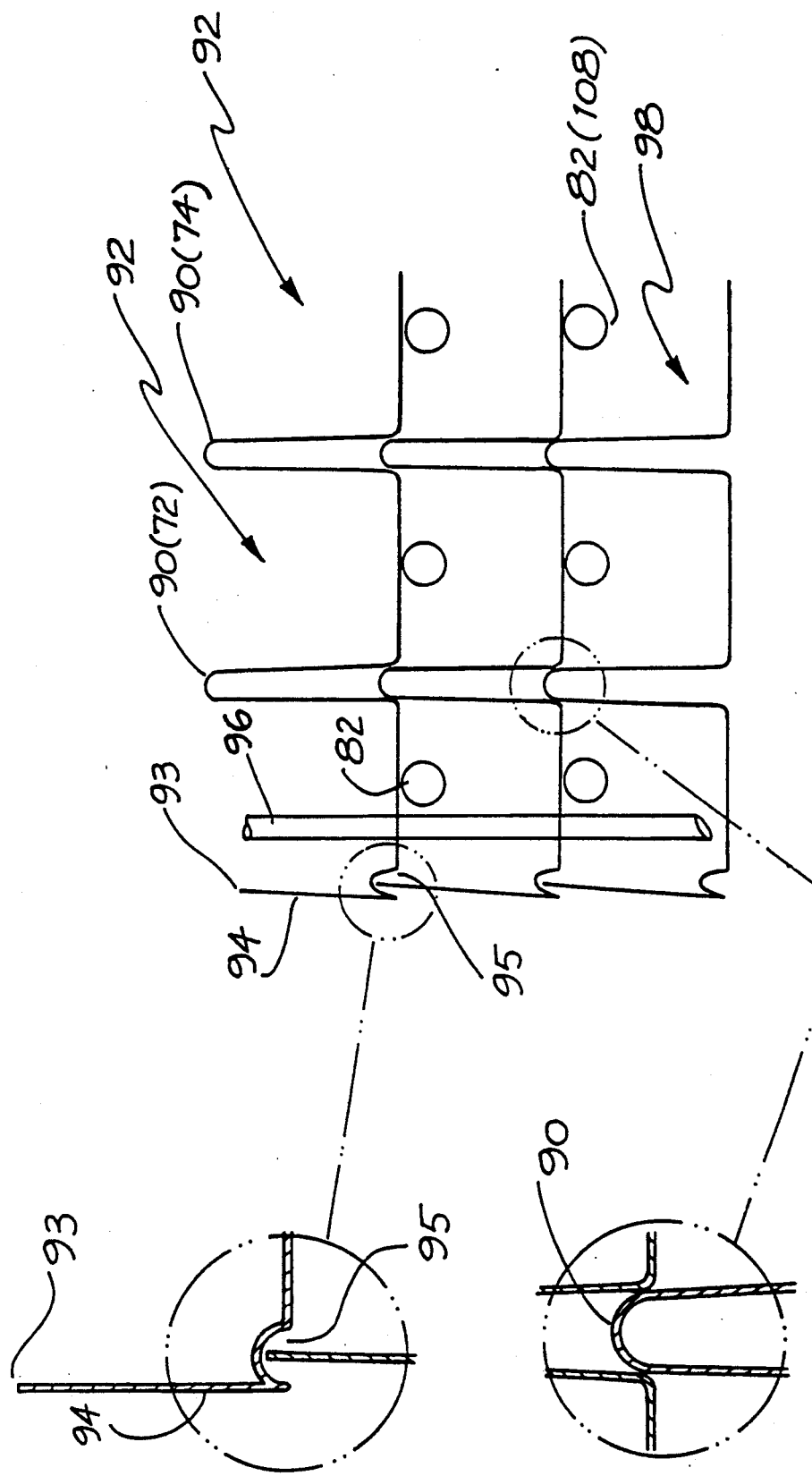
FIG. 7 shows schematically a how a stack of modules can be assembled according to the invention.

The heat exchange coil 82 in this embodiment is made of copper or stainless steel and rests on or underneath the surface of the module intermediate the walls 72 and 74. The coil 82 may be adhesively bonded or otherwise secured to this surface. The walls 72 and 74 are preferably made of plastic with the module being molded in a single piece of the form shown in FIG. 7. In FIG. 7 the walls 72 and 74 are defined by hollow walls 90. Successive walls defining a channel 92 accommodating a section of the coil 82. The walls 90 are shaped to enable successive layers of modules to be mated together. The outer walls 94 of successive modules are interlocked to provide sealing and support for the assembly by means of top edge 93 of wall 94 being clipped in sealing engagement within groove 95 formed about the perimeter of the module.

Preferably the HEF coils (82, 108) in successive modules are connected in parallel by vertical manifolds interconnecting the inlets and outlets. Thus HEF inlet 84 is connected to the HEF inlets of adjacent modules, and similarly the HEF outlet 86 is connected to the HEF outlets of the adjacent modules. In this configuration a primary refrigerant such as Freon is used such that it enters each module as a liquid and exits the module as a gas. However, other circuit configurations can be employed using series or combined parallel/series configurations depending on the particular application and the HEF employed, in particular if it does not undergo a phase change over the length of the unit configuration, for example if brine or a mixture of ethylene glycol-water is used.

In an assembled stack as shown in FIG. 7 PCM inlet 96 delivers the PCM fluid to the lowermost module 98. This module 98 is not provided with a heat exchange coil but merely circulates the PCM. This ensures that the lowermost module is not blocked preventing circulation of the PCM. The PCM is circulated from the bottommost module upwards towards an outlet at the top of the stack of modules to ensure circulation and rapid burnoff of the phase change medium.

Figure 6:
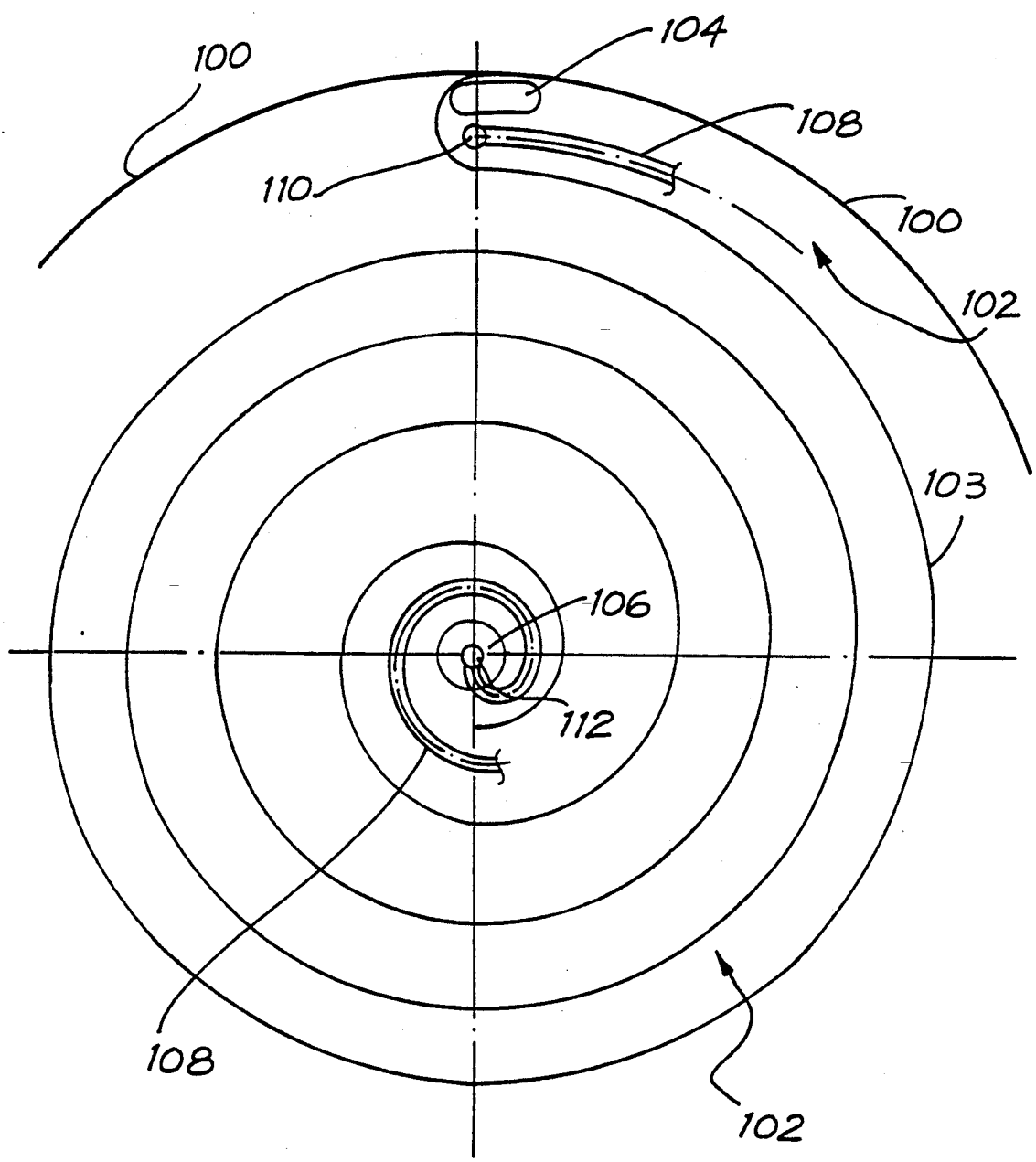
FIG. 6 shows a third embodiment of a module according to the invention.

A variation of the embodiment of FIG. 5 is shown in FIG. 6. Here, a circular module with exterior wall 100 has a spiral raceway 102 defined by wall 103 constraining the PCM to flow in a spiral pattern from the PCM inlet 104 to the PCM outlet 106. The heat exchange fluid is circulated in a coil 108 conforming to the spiral form of the raceway 102 from an inlet 110 to an outlet 112. Again, the module can be made as a molding of suitable plastics material in the manner as described with respect to FIG. 7, the walls 90 being provided to interlock with walls of adjacent modules when the modules are stacked one upon the other.

In addition to the modules being made out of plastic, fibreglass or the like may be used. Moreover, the heat conduction capability of any of these materials can be enhanced by the addition of fine metallic particles for example of copper or aluminium to these materials or the modules may be covered by metallic foil or sheet.

In the embodiments of FIGS. 5–7, the PCM fluid is normally only circulated during the reverse cycle of the phase change, e.g. from solid to liquid. This tends to conserve energy. To aid this circulation, the channels or the path(s) are dimensioned to allow a sufficient velocity of the circulating PCM e.g. water to provide adequate turbulence. Baffles (not shown) can be placed in the channels to increase this turbulence. This ensures improved heat transfer between the phase change medium and the HEF coils. Thus, for example with water as the PCM fluid rapid ice burnoff can be achieved. This removes a need to provide aeration of the phase change medium as in the prior art.

Also to increase agitation a controlled bypass of water can be provided set to supply a predetermined amount of water from the pump discharge directly into the return valve, to increase the flow of water through the ice field.

The examples of the modules shown above in FIGS. 4–6 are of a circular shape though other shapes of the module can be employed, for example ellipsoidal, square, rectangular, or in general, of a polygonal form, the form depending on the use the module is to have or the apparatus in which it is to be employed.

The size of the modules can be varied to suit the given application, however the spacing of the channels is preferably chosen to be in the range 150–200 mm and the height between adjacent modules would be approximately 100–150 mm.

The HEF employed in the heat exchange coil 82 can be a variety of known refrigerants but includes Freon R22, Freon R502 and a 20%–25% water-ethylene glycol mixture. The cost and complexity of circulating these primary refrigerants restricts their use to local applications. To service a "distant" load the PCM, if for example water, can be the circulated fluid used to transfer the thermal energy between the load and the thermal storage apparatus.

The lowermost module 116 in an assembled thermal storage apparatus as shown in FIG. 8 carries no HEF coils (82, 108 FIGS. 5–7) only PCM channels to avoid blockage of the PCM (e.g. water) circulation. When water is used as the PCM, ice 118 forms about the base 120 of each of the other modules and of the HEF coils (82, 108) as shown for the lowest four. The spacing of the modules is chosen to allow maximum ice buildup without blockage of the space between modules or at the wall(s) of the modules. Water can thus circulate in the spaces 122, entering the apparatus via the pipe 124 to start at the lowest module 116 thence through the meander of each module to exit at the top 126 of the apparatus.

When a thermal storage apparatus has been assembled from a plurality of modules such as described above the wall, for example integer 94 as shown in FIG. 7, or integer 12 in FIG. 1, becomes the innermost wall of the apparatus. This innermost wall contains the PCM fluid. The assembly of modules are placed inside a tank. The tank wall becomes the outer wall and is provided to enhance the strength of the assembly, and to allow suitable insulation (e.g. polyurethane) to fill the space between the tank and innermost wall. The perimeter walls 12, or 94 of the stack of the selected number of modules are locked together by four equally spaced flat stainless steel bars about the perimeter. These flat bars 120 (FIG. 5) are fitted into a grooved area (not shown) on the edge of each module. These four bars extend the full height of the apparatus with each module being bolted or riveted in turn to each of the respective stainless steel bars. These bars also provide a means whereby the module assembly can be lifted from within the tank wall. The four stainless steel bars are bolted in turn to four special fixing points at the top of the assembly so as to prevent movement of the entire heat exchanger core within the apparatus and to prevent the core assembly from floating when the ice is builtup, that is when the system is fully charged. These fixing points are also used to fix the lid of the apparatus. The lid in turn is provided with suitable insulation and can also be used to house the required mechanical equipment used to drive the HEF or the phase change medium through the apparatus. In order to protect the apparatus from the weather a full fibreglass canopy can be hinged to the top of the apparatus to enable access to the mechanical equipment or the inside of the apparatus.

Any number of thermal storage apparatus as described above can be connected in series or parallel to operate as a single unit. In turn a system so constructed can be designed so that it operates as a reverse cycle heat pump providing ice building thermal storage for cooling in summer and heating in winter, suitable equally for domestic commercial and industrial cooling and heating. The approved performance of the apparatus according to the invention enables the system to provide thermal storage at conventional temperatures of plus 2 degrees C. to 0 degrees C. in addition to enabling operation from 0 degrees C. to minus 20 degrees C. to cater for the needs of low temperature cool rooms. Equally the apparatus can be used for low temperature high speed chilling of liquids at approximately 0.5 degrees C. to minus 5 degrees C. Though the invention has been described above with respect to preferred embodiments thereof it is contemplated that variations thereof can be made within a knowledge of a person skilled in the art.

I claim:

1. A thermal storage module including
   a substantially planar base means having a top surface and a bottom surface;
   a flexible wall integral with and extending transversely from said base along the perimeter of said base;
   a path extending across and parallel to said base for circulating a phase change medium (PCM) fluid from an inlet to an outlet, said path being defined by projections substantially transverse to the plane of said base; and
   said base including heat exchange fluid (HEF) means for circulating a HEF from a HEF inlet to a HEF outlet across said base, said HEF means substantially conforming to the shape of said path.

2. A thermal storage module as claimed in claim 1 wherein said wall is substantially cylindrical, said wall and said base being made of fibreglass or plastics material.

3. A thermal storage module as claimed in claim 2 wherein said path is serpentine or spiral.

4. A thermal storage module as claimed in claim 3 wherein said HEF means is attached to said bottom surface of said base.

5. A thermal storage module as claimed in claim 1 wherein said projections are formed as hollow walls in said base at predetermined intervals.

6. A thermal storage module as claimed in claim 5 further including a groove formed in said bottom surface adjacent said perimeter and extending along said perimeter.

7. A thermal storage module as claimed in claim 2 wherein said path is spiral.

8. A thermal storage module as claimed in claim 7 wherein said HEF means is attached to said top surface of said base, said HEF means being tubular and made of copper, stainless steel or plastics material and said plastics material is polypropylene or polyethylene.

9. A thermal storage module as claimed in claim 8 wherein said projections comprise a spiral, substantially solid wall internal of said peripheral wall and secured to the top surface of said base.

10. A thermal storage apparatus including a stack of a plurality of thermal storage modules stacked one above the other, each module being as claimed in claim 9 and further including
    an aperture in each module;
    said apertures joining the path of a module of said stack with the associated path of an adjacent module;
    HEF inlet manifold means for interconnecting HEF inlets of adjacent modules;
    HEF outlet manifold means for interconnecting HEF outlets of adjacent modules; and
    a further module at the bottom of said stack, said further module having
    a substantially planar base means having a top surface and a bottom surface;
    a flexible wall integral with and extending transversely from said base at the perimeter of said base;
    a path extending across and parallel to said base for circulating a phase change medium (PCM) fluid from an inlet to an outlet, said path being defined by projections substantially transverse to the plane of said base; the path of said further module being interconnected with the path of the lowermost module of said stack; and
    means for circulating a PCM fluid through said stack and said further module along said respective paths.

11. A thermal storage apparatus as claimed in claim 10 wherein said circulating means comprises a first conduit means for supplying said PCM fluid to said inlet of said further module and a second conduit means for removing said PCM fluid from the outlet of the uppermost module of said stack, and wherein said aperture in each module of said stack is located adjacent said PCM inlet, whereby the PCM inlets and outlets of successive modules are aligned.

12. A thermal storage apparatus as claimed in claim 11 wherein said modules of said stack and said further module are stacked with superposed modules having the base of the upper module on nested relationship with the free end of the wall of the lower module.

13. A thermal storage module as claimed in claim 1 wherein said heat exchange fluid means are formed within said base between said top and bottom surfaces for the circulation of the heat exchange fluid (HEF) across said base.

14. A thermal storage module as claimed in claim 13 wherein said wall is cylindrical, and said heat exchange fluid (HEF) means comprise a plurality of parallel channel means formed between said top and said bottom surfaces of said base with each channel connecting to said HEF inlet and said HEF outlet via manifolds which extend symmetrically along respective arcs adjacent said perimeter.

15. A thermal storage module as claimed in claim 13 wherein said module is made of fibreglass or a plastics material.

16. A thermal storage module as claimed in claim 15 wherein said plastics material is polypropylene or polyethylene.

17. A thermal storage apparatus including a stack of a plurality of modules with each module being as claimed in claim 13 and further including
    at least one aperture in the base of each module for the passage of the PCM fluid between adjacent modules;
    a vertical HEF inlet manifold connecting the HEF inlets of each module;
    a vertical HEF outlet manifold connecting the HEF outlets of each module; and
    means for supporting adjacent modules in superposed relation in said stack.

18. A thermal storage apparatus as claimed in claim 17 wherein said supporting means include clip means extending transversely of the top and bottom surfaces of the bases of each module, said clip means accommodating support members extending between aligned clip means of adjacent modules; and wherein the walls of adjacent modules nest.

19. A thermal storage apparatus as claimed in claim 18 wherein each module is further characterised in that said wall is cylindrical and said clip means are located between said channel means.

20. A thermal storage apparatus as claimed in claim 19 wherein each said module is made of fibreglass or a plastics material.

21. A thermal storage apparatus as claimed in claim 20 wherein said plastics material is polypropylene or polyethylene.

22. A thermal storage apparatus as claimed in claim 21 further including a tank for accommodating therein said stack.

23. A thermal storage apparatus including a stack of a plurality of thermal storage modules stacked one above the other, each module being as claimed in claim 1 and further including
    an aperture in each module;
    said apertures joining the path of a module of said stack with the associated path of an adjacent module;
    HEF inlet manifold means for interconnecting HEF inlets of adjacent modules;
    HEF outlet manifold means for interconnecting HEF outlets of adjacent modules; and
    a further module at the bottom of said stack, said further module having
    a substantially planar base means having a top surface and a bottom surface;
    a flexible wall integral with and extending transversely from said base at the perimeter of said base;
    a path extending across and parallel to said base for circulating a phase change medium (PCM) fluid from an inlet to an outlet, said path being defined by projections substantially transverse to the plane of said base; the path of said further module being interconnected with the path of the lowermost module of said stack; and
    means for circulating a PCM fluid through said stack and said further module along said respective paths.

24. A thermal storage apparatus as claimed in claim 23 wherein said circulating means comprises a first conduit means for supplying said PCM fluid to said inlet of said further module and a second conduit means for removing said PCM fluid from the outlet of the uppermost module of said stack, and wherein said aperture in each module of said stack is located adjacent said PCM inlet, whereby the PCM inlets and outlets of successive modules are aligned.

25. A thermal storage apparatus as claimed in claim 24 wherein said HEF inlet and said HEF outlet manifold means connect said HEF means of each module in parallel.

26. A thermal storage apparatus as claimed in claim 25 wherein each module of said stack further includes a groove formed in said bottom surface, adjacent said perimeter and extending about said perimeter, whereby said modules are stacked by having the wall of each module retained within the groove of the next uppermost module, and the wall of said further module is retained in the groove of the lower most module of said stack.

27. A thermal storage apparatus as claimed in claim 26 wherein said paths are formed between hollow walls extending from said base at predetermined intervals.

28. A thermal storage apparatus as claimed in claim 27 wherein said walls are substantially cylindrical.

29. A thermal storage apparatus as claimed in claim 28 wherein said wall of each module and said further module have means for attaching support means at equally spaced positions about said perimeter for securing said stack and said further module as an assembly.

30. A thermal storage apparatus as claimed in claim 29 further including a tank enclosing said assembly and wherein said support means are four vertical bars the height of said stack.

31. A thermal storage apparatus as claimed in claim 30 wherein said modules are made of fibreglass or a plastics material.

32. A thermal storage apparatus as claimed in claim 31 wherein said plastics material is polypropylene or polyethylene.

33. A thermal storage apparatus as claimed in claim 32 wherein said paths are serpentine.

34. A thermal storage apparatus as claimed in claim 32 wherein said paths are spiral.

* * * * *